(12) United States Patent
Choi et al.

(10) Patent No.: US 10,053,573 B1
(45) Date of Patent: Aug. 21, 2018

(54) THERMOPLASTIC RESIN COMPOSITION AND METHOD OF PREPARING THE SAME

(71) Applicant: LG CHEM, LTD., Seoul (KR)

(72) Inventors: Jeong Su Choi, Daejeon (KR); Keun Hoon Yoo, Daejeon (KR); Won Seok Lee, Daejeon (KR); Seok Goo Jang, Daejeon (KR); Roo Da Lee, Daejeon (KR); Sang Hoo Park, Daejeon (KR); Ho Hoon Kim, Daejeon (KR); Hyung Seop Shim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 37 days.

(21) Appl. No.: 15/510,646

(22) PCT Filed: Jul. 29, 2016

(86) PCT No.: PCT/KR2016/008350
§ 371 (c)(1),
(2) Date: Mar. 10, 2017

(87) PCT Pub. No.: WO2017/039157
PCT Pub. Date: Mar. 9, 2017

(30) Foreign Application Priority Data

Aug. 31, 2015 (KR) ........................ 10-2015-0123006

(51) Int. Cl.
*C08L 33/20* (2006.01)

(52) U.S. Cl.
CPC ........... *C08L 33/20* (2013.01); *C08L 2201/08* (2013.01); *C08L 2201/10* (2013.01); *C08L 2205/025* (2013.01); *C08L 2205/03* (2013.01); *C08L 2205/06* (2013.01)

(58) Field of Classification Search
CPC .. C08L 33/20; C08L 2201/08; C08L 2201/10; C08L 2205/025; C08L 2205/03; C08L 2205/06
See application file for complete search history.

(56) References Cited

U.S. PATENT DOCUMENTS

| | | | |
|---|---|---|---|
| 4,233,409 A | 11/1980 | Bulkley | |
| 4,916,186 A | 4/1990 | Burk et al. | |
| 7,019,049 B1 * | 3/2006 | Yoo et al. | C08F 279/02 523/201 |
| 7,217,763 B2 * | 5/2007 | Choi et al. | C08F 279/02 525/69 |

FOREIGN PATENT DOCUMENTS

| | | |
|---|---|---|
| CN | 1099775 A | 3/1995 |
| CN | 1372579 A | 10/2002 |
| CN | 1626576 A | 6/2005 |
| CN | 101665606 A | 3/2010 |
| KR | 10-2001-0098765 A | 11/2001 |
| KR | 10-2002-0003484 A | 1/2002 |
| KR | 10-2015-0002267 A | 1/2015 |
| KR | 10-2015-0002476 A | 1/2015 |
| KR | 10-2015-0026532 A | 3/2015 |

OTHER PUBLICATIONS

International Search Report for International Patent Application No. PCT/KR2016/008350 filed Jul. 29, 2016.
Written Opinion for International Patent Application No. PCT/KR2016/008350 filed Jul. 29, 2016.
Office Action from Chinese Patent Office for Application No. 201680002779.8 dated Jun. 29, 2018.

* cited by examiner

*Primary Examiner* — Nathan M Nutter

(57) ABSTRACT

The present disclosure relates to a thermoplastic resin composition and a method of preparing the same. In accordance with the present disclosure, a thermoplastic resin composition having superior property balance, such as processability, chemical resistance, heat stability, and impact resistance, and excellent transparency, and a method of preparing the same are provided.

20 Claims, No Drawings

THERMOPLASTIC RESIN COMPOSITION AND METHOD OF PREPARING THE SAME

CROSS-REFERENCE TO RELATED APPLICATION(S)

This application is a U.S. National Stage of International Patent Application No. PCT/KR2016/008350, filed Jul. 29, 2016, which claims the priority benefit of Korean Patent Application No.10-2015-0123006, filed on Aug. 31, 2015 in the Korean Intellectual Property Office, the disclosures of which are incorporated herein by reference.

TECHNICAL FIELD

The present disclosure relates to a thermoplastic resin composition having superior transparency and impact resistance and a method of preparing the same, and more particularly to a thermoplastic resin composition having superior property balance, such as processability, chemical resistance, heat stability, and impact resistance, and excellent transparency, a method of preparing the same, and the like.

BACKGROUND ART

Recently, studies into impartation of high functionality, such as high transparency, to materials used in product models, is actively underway as the industry has advanced and the life has become diverse.

For example, research into giving transparency to existing materials, such as washing machine covers through which laundry is shown, cleaner dust collectors by which how much dust is collected can be checked, toys, game machine housings, and transparent windows of home appliances, is intensively underway.

An acrylonitrile-butadiene-styrene copolymer (ABS) resin, which has been widely used in these products, has excellent properties such as excellent impact resistance, chemical resistance, processability, and surface gloss. However, since this resin is inherently opaque, application thereof to cases requiring transparency is limited.

In general, a polycarbonate (PC) resin, a polymethyl methacrylate (PMMA) resin, a polystyrene (PS) resin, a polyacrylonitrile-styrene (SAN) resin, and the like are used as a transparent resin.

However, while such a polycarbonate (PC) resin has superior impact strength, transparency, and the like, processability thereof is poor, thereby making it difficult to produce complicated products. While a polymethyl methacrylate (PMMA) resin has superior optical properties, but impact resistance and chemical resistance thereof are very poor. In addition, a polystyrene (PS) resin, a polyacrylonitrile-styrene (SAN) resin, and the like have very poor impact resistance and chemical resistance.

U.S. Pat. No. 4,767,833, Japanese Patent Application Publication No. 1999-147020, European Patent No. 703,252, and Japanese Patent Application Publication No. 1996-199008 disclose a method of introducing an acrylic acid alkyl ester or methacrylic acid alkyl ester compound to an ABS resin having superior impact resistance, chemical resistance, processability, and the like to impart transparency. However, since the imparted transparency has a limitation, application thereof to products, which have a haze of greater than 2.0 and thus in which a PMMA resin, a PC resin, an SAN resin, or the like is used, thick injection-molded products, or products requiring high transparency is limited.

Therefore, there is an urgent need to develop a transparent resin having further improved transparency to provide transparency shown in products using a PC resin, an SAN resin, and the like and improved properties such as improved impact strength.

DISCLOSURE

Technical Problem

Therefore, the present invention has been made in view of the above problems, and it is one object of the present invention to provide a thermoplastic resin composition having superior property balance, such as processability, chemical resistance, heat stability, and impact resistance, and excellent transparency, a method of preparing the same, and the like.

The above and other objects of the present disclosure can be accomplished by the present invention described below.

Technical Solution

In accordance with an aspect of the present invention, the above and other objects can be accomplished by the provision of a thermoplastic resin composition, including: (A-1) a graft copolymer formed by graft-copolymerizing (a-1) a conjugated diene rubber latex having a weight average particle diameter of 500 Å to 2,000 Å with (b-1) a methacrylic acid alkyl ester compound or an acrylic acid alkyl ester compound, (c-1) an aromatic vinyl compound, and (d-1) a vinyl cyan compound; (A-2) a graft copolymer formed by graft-copolymerizing (a-2) a conjugated diene rubber latex having a weight average particle diameter of 2,500 Å to 5,000 Å with (b-2) a methacrylic acid alkyl ester compound or an acrylic acid alkyl ester compound, (c-2) an aromatic vinyl compound, and (d-2) a vinyl cyan compound; and (B) a copolymer formed by polymerizing i) a methacrylic acid alkyl ester compound or an acrylic acid alkyl ester compound, ii) an aromatic vinyl compound, and iii) a vinyl cyan compound, wherein the thermoplastic resin composition satisfies Mathematical Equation 1 below:

$$0.75 \leq X_{a\text{-}1}/X_{a\text{-}2} \leq 4 \qquad \text{[Mathematical Equation 1]}$$

wherein $X_{a\text{-}1}$ refers to the weight of (a-1) the conjugated diene rubber latex (based on solid content) and $X_{a\text{-}2}$ refers to the weight of (a-2) the conjugated diene rubber latex (based on solid content), wherein a refractive index difference between (A-1) the graft copolymer and (A-2) the graft copolymer is 0.01 or less, and a refractive index difference between (A-1) the graft copolymer or (A-2) the graft copolymer and (B) the copolymer is 0.01 or less.

The thermoplastic resin composition has, for example, a haze of 1.3 or less and an impact strength of 10 kg·cm/cm or more.

The thermoplastic resin composition may include, for example, 10 to 60% by weight of (A-1) the graft copolymer, 10 to 50% by weight of (A-2) the graft copolymer, and 30 to 80% by weight of (B) the copolymer, wherein (A-1)+(A-2)+(B)=100% by weight.

The thermoplastic resin composition may include, for example, 5 to 30% by weight (based on solid content) of (a-1) the conjugated diene rubber latex.

The thermoplastic resin composition may include, for example, 5 to 20% by weight (based on solid content) of (a-2) the conjugated diene rubber latex.

The thermoplastic resin composition may include, for example, a methacrylic acid alkyl ester compound and acrylic acid alkyl ester compound in a total amount of 20 to 70% by weight.

The methacrylic acid alkyl ester compound may be, for example, methyl methacrylate.

The thermoplastic resin composition may include, for example, 10 to 30% by weight of an aromatic vinyl compound.

The aromatic vinyl compound may be, for example, one or more selected from the group consisting of styrene, α-methylstyrene, o-ethylstyrene, p-ethylstyrene, and vinyltoluene.

The thermoplastic resin composition may include, for example, 0 to 10% by weight of a vinyl cyan compound.

The vinyl cyan compound may be, for example, one or more selected from the group consisting of acrylonitrile, methacrylonitrile, and ethacrylonitrile.

(A-1) The graft copolymer may be a copolymer formed by, for example, polymerizing 20 to 70% by weight (based on solid content) of (a-1) the conjugated diene rubber latex with 20 to 60% by weight of (b) a methacrylic acid alkyl ester compound or acrylic acid alkyl ester compound, 7 to 30% by weight of (c) an aromatic vinyl compound, and 0 to 10% by weight of (d) a vinyl cyan compound.

(A-2) The graft copolymer may be a copolymer formed by, for example, polymerizing 20 to 70% by weight (based on solid content) of (a-2) the conjugated diene rubber latex with 20 to 60% by weight of (b) a methacrylic acid alkyl ester compound or acrylic acid alkyl ester compound, 7 to 30% by weight of (c) an aromatic vinyl compound, and 0 to 10% by weight of (d) a vinyl cyan compound.

(B) The copolymer may be a copolymer formed by, for example, polymerizing 30 to 75% by weight of a methacrylic acid alkyl ester compound or acrylic acid alkyl ester compound, 15 to 40% by weight of an aromatic vinyl compound, and 0 to 20% by weight of a vinyl cyan compound.

A refractive index difference between the conjugated diene rubber latex and a polymer grafted to the conjugated diene rubber latex may be, for example, 0.01 or less.

A refractive index difference between (a-1) the conjugated diene rubber latex and (a-2) the conjugated diene rubber latex may be, for example, 0.01 or less.

A refractive index difference between (A-1) the graft copolymer or (A-2) the graft copolymer and (B) the copolymer may be, for example, 0.01 or less.

The thermoplastic resin composition may further include, for example, one or more selected from the group consisting of a thermal stabilizer, a UV stabilizer, and a lubricant and antioxidant.

In accordance with another aspect of the present invention, there is provided a method of preparing a thermoplastic resin composition, the method including a step of melt-kneading (A-1) a graft copolymer formed by graft-copolymerizing (a-1) a conjugated diene rubber latex having a weight average particle diameter of 500 Å to 2,000 Å with (b-1) a methacrylic acid alkyl ester compound or an acrylic acid alkyl ester compound, (c-1) an aromatic vinyl compound, and (d-1) a vinyl cyan compound; (A-2) a graft copolymer formed by graft-copolymerizing (a-2) a conjugated diene rubber latex having a weight average particle diameter of 2,500 Å to 5,000 Å with (b-2) a methacrylic acid alkyl ester compound or an acrylic acid alkyl ester compound, (c-2) an aromatic vinyl compound, and (d-2) a vinyl cyan compound; and (B) a copolymer formed by bulk-polymerizing i) a methacrylic acid alkyl ester compound or an acrylic acid alkyl ester compound, ii) an aromatic vinyl compound, and iii) a vinyl cyan compound, wherein the thermoplastic resin composition satisfies Mathematical Equation 1 below:

$$0.75 \leq X_{a-1}/X_{a-2} \leq 4 \qquad \text{[Mathematical Equation 1]}$$

wherein $X_{a-1}$ refers to the weight of (a-1) the conjugated diene rubber latex (based on solid content) and $X_{a-2}$ refers to the weight of (a-2) the conjugated diene rubber latex (based on solid content), wherein a refractive index difference between (A-1) the graft copolymer and (A-2) the graft copolymer is 0.01 or less, and a refractive index difference between (A-1) the graft copolymer or (A-2) the graft copolymer and (B) the copolymer is 0.01 or less.

In accordance with yet another aspect of the present invention, there is provided a molded article manufactured from the thermoplastic resin composition.

The molded article may be, for example, a washing machine cover, a cleaner dust collector, a toy, a game machine housing, a home appliance transparent window, or an office equipment transparent window.

Advantageous Effects

As apparent from the above description, the present invention provides a thermoplastic resin composition having superior property balance, such as processability, chemical resistance, heat stability, and impact resistance, and excellent transparency, a method of preparing the same, and the like.

BEST MODE

Hereinafter, the present disclosure is described in detail.

The present inventors have made intensive studies on a method of further improving transparency while maintaining impact strength. As a result, the present inventors confirmed that, when a graft copolymer formed by graft-copolymerizing a conjugated diene rubber latex having a weight average particle diameter of 500 Å to 2,000 Å with a methacrylic acid alkyl ester compound or an acrylic acid alkyl ester compound, an aromatic vinyl compound, and a vinyl cyan compound; and the graft copolymer formed by graft-copolymerizing a conjugated diene rubber latex having a weight average particle diameter of 2,500 Å to 5,000 Å with a methacrylic acid alkyl ester compound or an acrylic acid alkyl ester compound, an aromatic vinyl compound, and a vinyl cyan compound are applied to a copolymer formed by bulk-polymerizing a methacrylic acid alkyl ester compound or an acrylic acid alkyl ester compound, an aromatic vinyl compound, and a vinyl cyan compound are applied to have a specific refractive index difference in a specific weight ratio, a thermoplastic resin composition having superior impact resistance and excellent transparency, i.e., a haze of 1.3 or less, is produced, thus completing the present invention.

The thermoplastic resin composition according to the present disclosure is characterized by including (A-1) a graft copolymer formed by graft-copolymerizing (a-1) a conjugated diene rubber latex having a weight average particle diameter of 500 Å to 2,000 Å with (b-1) a methacrylic acid alkyl ester compound or an acrylic acid alkyl ester compound, (c-1) an aromatic vinyl compound, and (d-1) a vinyl cyan compound; (A-2) a graft copolymer formed by graft-copolymerizing (a-2) a conjugated diene rubber latex having a weight average particle diameter of 2,500 Å to 5,000 Å with (b-2) a methacrylic acid alkyl ester compound or an acrylic acid alkyl ester compound, (c-2) an aromatic vinyl compound, and (d-2) a vinyl cyan compound; and (B) a copolymer formed by polymerizing i) a methacrylic acid alkyl ester compound or an acrylic acid alkyl ester compound, ii) an aromatic vinyl compound, and iii) a vinyl cyan compound, wherein the thermoplastic resin composition satisfies Mathematical Equation 1 below:

$$0.75 \leq X_{a-1}/X_{a-2} \leq 4 \qquad \text{[Mathematical Equation 1]}$$

wherein $X_{a-1}$ refers to the weight of (a-1) the conjugated diene rubber latex (based on solid content) and $X_{a-2}$ refers to the weight of (a-2) the conjugated diene rubber latex (based on solid content), wherein a refractive index difference between (A-1) the graft copolymer and (A-2) the graft copolymer is 0.01 or less, and a refractive index difference between (A-1) the graft copolymer or (A-2) the graft copolymer and (B) the copolymer is 0.01 or less.

In the present disclosure, the content of the rubber latex is based on solid content of the rubber latex.

The thermoplastic resin composition may include, for example, 10 to 60% by weight of (A-1) the graft copolymer, 10 to 50% by weight of (A-2) the graft copolymer, and 30 to 80% by weight of (B) the copolymer, wherein (A-1)+(A-2)+(B)=100% by weight. Within this range, superior impact strength and transparency are provided.

In another embodiment, the thermoplastic resin composition may include 20 to 50% by weight of (A-1) the graft copolymer, 10 to 30% by weight of (A-2) the graft copolymer, and 40 to 70% by weight of (B) the copolymer. Within this range, superior impact strength and transparency are provided.

In another embodiment, the thermoplastic resin composition may include 25 to 45% by weight of (A-1) the graft copolymer, 10 to 25% by weight of (A-2) the graft copolymer, and 45 to 55% by weight of (B) the copolymer. Within this range, superior impact strength and transparency are provided.

When $X_{a-1}/X_{a-2}$ is less than 0.75, transparency is decreased. On the other hand, when $X_{a-1}/X_{a-2}$ is greater than 4, impact strength is decreased, and thus, the purpose of the present disclosure is not satisfied.

In another embodiment, $X_{a-1}/X_{a-2}$ may be 1 to 3, 1.5 to 3, or 1.5 to 2.7. Within this range, superior transparency, impact strength, and the like are provided.

The thermoplastic resin composition may include, for example, 5 to 30% by weight of (a-1) the conjugated diene rubber latex. When the content of (a-1) the conjugated diene rubber latex is less than 5% by weight, impact strength is decreased, and thus, the purpose of the present disclosure is not satisfied. On the other hand, when the content of (a-1) the conjugated diene rubber latex is greater than 30% by weight, transparency is decreased and flow marks are formed on a surface, whereby transparency is decreased.

In another embodiment, the thermoplastic resin composition may include 10 to 25% by weight or 13 to 22% by weight of (a-1) the conjugated diene rubber latex. Within this range, superior impact strength and transparency are provided.

(a-1) The conjugated diene rubber latex may have, for example, a weight average particle diameter of 1,000 Å to 1,500 Å, or 1,100 Å to 1,300 Å. Within this range, superior impact strength and transparency are provided.

The thermoplastic resin composition may include, for example, 5 to 20% by weight of (a-2) the conjugated diene rubber latex. When the content of (a-2) the conjugated diene rubber latex is less than 5% by weight, impact strength is decreased, and thus, the purpose of the present disclosure is not satisfied. When the content of (a-2) the conjugated diene rubber latex is greater than 20% by weight, transparency is decreased, and thus, it is difficult to accomplish a transparency (i.e., a haze of 1.3 or less) required in the present disclosure.

In another embodiment, the thermoplastic resin composition may include 5 to 15% by weight or 6 to 12% by weight of (a-2) the conjugated diene rubber latex. Within this range, superior impact strength and transparency are provided.

(a-2) The conjugated diene rubber latex may have, for example, a weight average particle diameter of 2,500 Å to 4,000 Å, or 2,800 Å to 3,500 Å. Within this range, superior impact strength and transparency are provided.

The conjugated diene rubber is a conjugated diene compound polymer having a structure wherein a double bond and a single bond are alternately arranged.

The conjugated diene compound may be, for example, one or more selected from the group consisting of butadiene, isoprene, chloroprene, and piperylene.

The conjugated diene rubber may be, for example, one or more selected from the group consisting of butadiene polymer, butadiene-styrene copolymer (SBR), and butadiene-acrylonitrile copolymer (NBR) and polymers derived therefrom. In particular, a butadiene copolymer or a butadiene-styrene copolymer is preferred. In this case, impact strength satisfying the purpose of the present disclosure and superior transparency are provided.

The derived polymer refers to a polymer polymerized by an additionally added denaturant, a polymer modified by a modifier, a polymer, an unsaturated group of which is hydrogenated, or a polymer, some groups of which are substituted with other groups.

The thermoplastic resin composition may include, for example, a methacrylic acid alkyl ester compound and acrylic acid alkyl ester compound in a total amount of 20 to 70% by weight, 40 to 60% by weight, or 50 to 60% by weight. Within this range, the thermoplastic resin composition has a refractive index matching that of the conjugated diene rubber latex, whereby superior transparency is provided.

The thermoplastic resin composition may include, for example, 10 to 30% by weight, 15 to 25% by weight, or 15 to 20% by weight of an aromatic vinyl compound. Within this range, the thermoplastic resin composition has a refractive index matching that of the conjugated diene rubber latex, whereby superior transparency is provided.

The thermoplastic resin composition may include, for example, 0 to 10% by weight, 1 to 8% by weight, or 3 to 6% by weight of a vinyl cyan compound. Within this range, superior color characteristics are provided (not yellowish), thereby satisfying the purpose of the present disclosure.

(A-1) The graft copolymer may be a copolymer formed by, for example, polymerizing 20 to 70% by weight (based on solid content) of (a-1) the conjugated diene rubber latex with 20 to 60% by weight of (b) a methacrylic acid alkyl ester compound or acrylic acid alkyl ester compound, 7 to 30% by weight of (c) an aromatic vinyl compound, and 0 to 10% by weight of (d) a vinyl cyan compound.

When the content of (a-1) the conjugated diene rubber latex in (A-1) the graft copolymer is less than 20% by weight, impact strength is decreased. On the other hand, when the content of (a-1) the conjugated diene rubber latex in (A-1) the graft copolymer is greater than 70% by weight, complete grafting does not occur during polymerization, whereby mechanical properties are very poor and transparency is decreased.

When the content of the vinyl cyan compound in (A-1) the graft copolymer is greater than 10 parts by weight, the color of a resin turns yellow, whereby consumers' desire for natural color is not satisfied. In addition, a large amount of a solid (coagulum) is generated during graft-polymerizing, whereby it is difficult to produce a resin.

In another embodiment, (A-1) the graft copolymer may be a copolymer formed by polymerizing (a-1) 40 to 60% by weight (based on solid content) of the conjugated diene rubber latex with (b) 25 to 45% by weight of a methacrylic acid alkyl ester compound or acrylic acid alkyl ester compound, (c) 10 to 20% by weight of an aromatic vinyl compound, and (d) 1 to 5% by weight of a vinyl cyan compound. Within this range, superior impact strength and transparency are provided.

(A-2) The graft copolymer may be a copolymer formed by, for example, polymerizing 20 to 70% by weight (based on solid content) of (a-2) the conjugated diene rubber latex with 20 to 60% by weight of (b) a methacrylic acid alkyl ester compound or acrylic acid alkyl ester compound, 7 to 30% by weight of (c) an aromatic vinyl compound, and 0 to 10% by weight of (d) a vinyl cyan compound.

When the content of (a-2) the conjugated diene rubber latex in (A-2) the graft copolymer is less than 20 parts by weight, impact strength is decreased. On the other hand, when the content of (a-2) the conjugated diene rubber latex in (A-2) the graft copolymer is greater than 70 parts by weight, complete grafting does not occur during polymerization, whereby mechanical properties are greatly deteriorated and transparency is decreased.

When the content of the vinyl cyan compound in (A-2) the graft copolymer is greater than 10 parts by weight, the color of a resin turns yellow, whereby consumers' desire for natural color is not satisfied and a large amount of solid (coagulum) is generated during grafting polymerization. Accordingly, it is difficult to produce a resin.

(A-2) The graft copolymer may be, for example, a polymer formed by polymerizing (a-2) 40 to 60% by weight (based on solid content) of the conjugated diene rubber latex with (b) 25 to 45% by weight of a methacrylic acid alkyl ester compound or acrylic acid alkyl ester compound, (c) 10 to 20% by weight of an aromatic vinyl compound, and (d) 1 to 5% by weight of a vinyl cyan compound. Within this range, superior impact strength and transparency are provided.

The transparency of each of (A-1) the graft copolymer and (A-2) the graft copolymer of the present disclosure is determined depending upon the refractive indexes of a rubber and grafted polymer. Here, the refractive index of the grafted polymer is adjusted depending upon a mixing ratio of monomers. To have transparency, the refractive index of the conjugated diene rubber latex should match refractive indexes of other ingredients. Accordingly, a mixing ratio of monomers is very important. That is, to have transparency, the refractive index of the conjugated diene rubber, which is used as a seed for grafting, should be similar to the refractive index of a total of gradients grafted thereto. A refractive index difference between the refractive index of the conjugated diene rubber latex and a total of grafted compounds is preferably 0.01 or less. More preferably, the refractive index of the conjugated diene rubber is the same as that of a total of ingredients grafted thereto.

The refractive indexes of polymers of the monomers used in the present disclosure are as follows: butadiene: about 1.518, methyl methacrylate: about 1.49, styrene: about 1.59, acrylonitrile: about 1.52, acrylic acid: about 1.527, and polyethyleneglycol monomethacrylate: about 1.49 to 1.52.

In addition, the refractive index of a mixture of compounds graft-polymerized to the conjugated diene rubber of the grafted copolymer, i.e., a copolymer, may be calculated according to the following equation:

$$RI = \Sigma Wti * RIi$$

Wti=Weight Fraction of Each Ingredient in Copolymer (%)

RIi=Refractive Index of Polymer of Each Ingredient of Copolymer

The refractive indexes of (a-1) the conjugated diene rubber latex and (a-2) the conjugated diene rubber latex are related to the transparency of product. A refractive index difference between (a-1) the conjugated diene rubber latex and (a-2) the conjugated diene rubber latex is preferably 0.01 or less. More preferably, the refractive index of (a-1) the conjugated diene rubber latex matches that of (a-2) the refractive index.

(A-1) The grafted copolymer and (A-2) the grafted copolymer are respectively prepared by emulsion polymerization. The ingredients (monomers) for grafting may be added batchwise or a portion or the entirety thereof may be continuously added, in the presence of the conjugated diene rubber latex.

The continuous addition may be carried out, for example, by a stream or dropwise for a determined time.

The emulsifier used in the emulsion polymerization may be, for example, an alkyl aryl sulfonate, an alkali metal alkyl sulfate, a sulfonated alkyl ester salt, an alkyl (alkenyl) carboxylate, or an alkyl (alkenyl) succinate, or the like. These compounds may be used alone or as a mixture of two or more thereof.

The graft copolymer in an emulsified state after the emulsion polymerization may be prepared, for example, into a powder by coagulating the emulsified graft copolymer into a coagulant and then dehydrating and drying the same.

(B) The copolymer may be a copolymer formed by, for example, polymerizing 30 to 75% by weight of a methacrylic acid alkyl ester compound or acrylic acid alkyl ester compound, 15 to 40% by weight of an aromatic vinyl compound, and 0 to 20% by weight of a vinyl cyan compound. When the content of the vinyl cyan compound is greater than 20% by weight, color turns yellow.

In another embodiment, (B) the copolymer may be a copolymer formed by polymerizing 60 to 75% by weight of a methacrylic acid alkyl ester compound or an acrylic acid alkyl ester compound, 20 to 30% by weight of an aromatic vinyl compound, and 1 to 10% by weight of a vinyl cyan compound. Within this range, superior impact strength, color characteristics and transparency are provided.

A method of preparing (B) the copolymer is not specifically limited, but suspension polymerization or bulk polymerization is suitable. In particular, continuous bulk polymerization is the most preferable method in terms of production cost.

A refractive index difference between (A-1) the graft copolymer or (A-2) the graft copolymer and (B) the copolymer may be, for example, 0.01 or less. Within this range, superior transparency is provided, and thus, the purpose of the present disclosure is satisfied.

The aromatic vinyl compound of the present disclosure may be, for example, one or more selected from the group consisting of styrene, α-methylstyrene, o-ethylstyrene, p-methylstyrene, and vinyltoluene. Preferably, the aromatic vinyl compound is styrene.

For example, the vinyl cyan compound of the present disclosure is preferably one or more selected from the group consisting of acrylonitrile, methacrylonitrile and ethacrylonitrile.

The present disclosure of a methacrylic acid alkyl ester compound or an acrylic acid alkyl ester compound may be, for example, one or more selected from the group consisting of (meth)acrylic acid methyl ester, (meth)acrylic acid ethyl ester, (meth)acrylic acid propyl ester, (meth)acrylic acid 2-ethylhexyl ester, (meth)acrylic acid decyl ester and (meth) acrylic acid lauryl ester. Thereamong, methyl methacrylate, as (meth)acrylic acid methyl ester, is most preferred.

The thermoplastic resin composition may have, for example, a haze of 1.3 or less, or 1.2 or less and an impact strength of 10 kg·cm/cm or more, or 11 kg·cm/cm or more.

The thermoplastic resin composition may further include, for example, one or more selected from the group consisting of a thermal stabilizer, a UV stabilizer, a lubricant, and an antioxidant in a range in which the properties thereof are not affected.

The present disclosure provides a method of preparing a thermoplastic resin composition, the method including a step of melt-kneading (A-1) a graft copolymer formed by graft-copolymerizing (a-1) a conjugated diene rubber latex having a weight average particle diameter of 500 Å to 2,000 Å with (b-1) a methacrylic acid alkyl ester compound or an acrylic acid alkyl ester compound, (c-1) an aromatic vinyl compound, and (d-1) a vinyl cyan compound; (A-2) a graft copolymer formed by graft-copolymerizing (a-2) a conjugated diene rubber latex having a weight average particle diameter of 2,500 Å to 5,000 Å with (b-2) a methacrylic acid alkyl ester compound or an acrylic acid alkyl ester compound, (c-2) an aromatic vinyl compound, and (d-2) a vinyl cyan compound; and (B) a copolymer formed by bulk-polymerizing i) a methacrylic acid alkyl ester compound or an acrylic acid alkyl ester compound, ii) an aromatic vinyl compound, and iii) a vinyl cyan compound, wherein the thermoplastic resin composition satisfies Mathematical Equation 1 below:

$$0.75 \leq X_{a-1}/X_{a-2} \leq 4 \qquad \text{[Mathematical Equation 1]}$$

wherein $X_{a-1}$ refers to the weight of (a-1) the conjugated diene rubber latex (based on solid content) and $X_{a-2}$ refers to the weight of (a-2) the conjugated diene rubber latex (based on solid content), wherein a refractive index difference between (A-1) the graft copolymer and (A-2) the graft copolymer is 0.01 or less, and a refractive index difference between (A-1) the graft copolymer or (A-2) the graft copolymer and (B) the copolymer is 0.01 or less.

The method of preparing the thermoplastic resin composition may include, for example, I) a step of mixing (a-1) the conjugated diene rubber latex having a weight average particle diameter of 500 Å to 2,000 Å with (b-1) the methacrylic acid alkyl ester compound or the acrylic acid alkyl ester compound, (c-1) the aromatic vinyl compound, and (d-1) the vinyl cyan compound and then forming a grafted layer through copolymerization to prepare the graft copolymer (A-1); II) a step of mixing (a-2) the conjugated diene rubber latex having a weight average particle diameter of 2,500 Å to 5,000 Å with (b-2) the methacrylic acid alkyl ester compound or the acrylic acid alkyl ester compound, (c-2) the aromatic vinyl compound, and (d-2) the vinyl cyan compound and then forming a grafted layer through copolymerization to prepare the graft copolymer (A-2); III) a step of bulk polymerizing i) the methacrylic acid alkyl ester compound or the acrylic acid alkyl ester compound, ii) the aromatic vinyl compound, and iii) the vinyl cyan compound to prepare the copolymer (B); and a step of mixing and kneading IV) (A-1) the graft copolymer, (A-2) the graft copolymer, and (B) the copolymer.

The thermoplastic resin composition may be kneaded, for example, by means of a single screw extruder, a twin screw extruder, a banbury mixer, or the like. Subsequently, the kneaded thermoplastic resin composition is extruded and is uniformly dispersed, followed by being soaked in a water bath and being cut. As a result, a pellet-type transparent resin may be prepared.

In addition, the present disclosure provides molded article manufacture from the thermoplastic resin composition.

The molded article may be, for example, a washing machine cover, a cleaner dust collector, a toy, a game machine housing, a home appliance transparent window, or an office equipment transparent window.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLE

Preparation Example I-1-1

Method of Preparing Graft Copolymer (A-1-1)

To 50 parts by weight (based on solid content) of a polybutadiene rubber latex, which had a gel content of 90% and an average particle diameter of 1200 Å, prepared by emulsion polymerization, 100 parts by weight of an exchanged water, 1.0 parts by weight of a sodium oleate emulsifier, 35 parts by weight of methyl methacrylate, 12 parts by weight of styrene, 3 parts by weight of acrylonitrile, 0.5 parts by weight of tertiary dodecyl mercaptan, 0.05 parts by weight of ehylenediamine tetraacetic acid, 0.1 parts by weight of sodium formaldehyde sulfoxylate, 0.001 parts by weight of ferrous sulfide, 0.2 parts by weight of tertiary butyl hydroperoxide were continuously added at 5° C. over five hours such that polymerization occurred. Subsequently, aging was carried out at 80° C. for one hour and then reaction was terminated. Subsequently, an obtained latex was coagulated using 2 parts by weight of magnesium sulfate, as a coagulant, followed by dehydration and drying. As a result, a powder-type graft copolymer was obtained. The refractive index of the obtained graft copolymer was 1.516.

Preparation Example I-1-2

Method of Preparing Grafted Copolymer (A-1-2)

A graft copolymer was obtained in the same manner as in Preparation Example I-1-1, except that 25 parts by weight (based on solid content) of a polybutadiene rubber latex having a gel content of 90% and an average particle diameter of 1200 Å and 25 parts by weight (based on solid content) of a polybutadiene rubber latex having a gel content of 70% and an average particle diameter of 3000 Å were used instead of the rubber latex used in Preparation Example I-1-1. The refractive index of the obtained graft copolymer was 1.516.

Preparation Example I-1-3

Method of Preparing Grafted Copolymer (A-1-3)

A graft copolymer was obtained in the same manner as in Preparation Example I-1-1, except that 60 parts by weight (based on solid content) of a polybutadiene rubber latex having a gel content of 90% and an average particle diameter of 1200 Å, 28 parts by weight of methyl methacrylate, 10 parts by weight of styrene, 2 parts by weight of acrylonitrile, and 0.4 parts by weight of tertiary dodecyl mercaptan were used. The refractive index of the obtained graft copolymer was 1.516.

Preparation Example I-2-1

Method of Preparing Grafted Copolymer (A-2-1)

A graft copolymer was obtained in the same manner as in Preparation Example I-1-1, except that 50 parts by weight of polybutadiene rubber latex having a gel content of 70% and an average particle diameter of 3000 Å were used instead of the rubber latex used in Preparation Example I-1-1. The refractive index of the obtained graft copolymer was 1.516.

Preparation Example I-2-2

Method of Preparing Grafted Copolymer (A-2-2)

A graft copolymer was obtained in the same manner as in Preparation Example I-2-1, except that methyl methacrylate, which was used in Preparation Example I-2-1, was used in an amount of 29.8 parts by weight instead of 35 parts by weight and styrene, which was used in Preparation Example I-2-1, was used in an amount of 19.2 parts by weight instead of 12 parts by weight. The refractive index of the obtained graft copolymer was 1.53.

Preparation Example II-1

Method of Preparing MSAN Resin (B-1)

70.4 parts by weight of methyl methacrylate, 24.6 parts by weight of styrene, and 5 parts by weight of acrylonitrile were mixed with 30 parts by weight of toluene, as a solvent, and 0.15 parts by weight of di-t-dodecyl mercaptan, as a molecular weight regulator. A resultant mixture was continuously added to a reactor over three hours on average while maintaining a reaction temperature at 148° C. Subsequently, a resultant polymerized solution was discharged from the reactor. The discharged polymerized solution was heated in a preparatory heating bath, and unreacted monomers were volatilized in a volatilization vessel. Subsequently, while maintaining the temperature of a polymer at 210° C., a copolymer (MSAN resin) was processed into a pellet form by means of a polymer transfer pump extrusion machine. The refractive index of the prepared MSAN resin was 1.516.

Preparation Example II-2

Method of Preparing MMSAN Resin (B-2)

A graft copolymer was obtained in the same manner as in Preparation Example II-1, except that 40 parts by weight of methyl methacrylate and 50 parts by weight of styrene were used instead of 70.4 parts by weight of methyl methacrylate and 24.6 parts by weight of styrene used in Preparation Example II-1. The refractive index of the prepared MSAN resin was 1.542.

Examples 1 and 2 and Comparative Examples 1 to 4

Each of the grafted copolymers and the MSAN resins prepared according to Preparation Examples I-1-1 to 11-2 was mixed as summarized in Table 1 below, and 0.3 parts by weight of a lubricant and 0.2 parts by weight of an antioxidant were added thereto. A resultant mixture was prepared into a pellet-type thermoplastic resin composition by means of a biaxial extrusion kneader in a 220° C. cylinder. A prepared pellet was injection-molded, whereby a specimen was prepared.

TABLE 1

| Classification | Graft copolymer (A) | | | | | MSAN (B) | |
| --- | --- | --- | --- | --- | --- | --- | --- |
| | A-1-1 | A-1-2 | A-1-3 | A-2-1 | A-2-2 | B-1 | B-2 |
| Example 1 | 30 | | | 20 | | 50 | |
| Example 2 | 40 | | | 15 | | 55 | |
| Example 3 | | | 27 | 13 | | 60 | |
| Comparative Example 1 | | 50 | | | | 50 | |
| Comparative Example 2 | 30 | | | | 20 | 50 | |
| Comparative Example 3 | 30 | | | 20 | | | 50 |
| Comparative Example 4 | 10 | | | 40 | | 50 | |
| Comparative Example 5 | 45 | | | 5 | | 50 | |
| Comparative Example 6 | 20 | | | 30 | | | |
| Comparative Example 7 | 33 | | | 7 | | | |

Test Example

The properties of each of the thermoplastic resin composition specimens prepared according to each of Examples 1 to 3 and Comparative Examples 1 to 7 were measured according to the following methods. Results are summarized in Table 2 below.

Weight average particle diameter: The weight average particle size of a rubber latex used in polymerization was measured by means of Nicomp 380.

Refractive index: To investigate the refractive index of each copolymer, the copolymer was thinly spread to a thickness of about 0.2 mm. Measurement was performed by means of an Abbe refractometer at 25° C.

Transparency (haze value): Measured according to ASTM1003.

Impact strength (Notched Izod Impact Strength): Notched Izod impact strength was measured according to ASTM245 D256.

TABLE 2

| Classification | Transparency (haze) | Impact strength (kg · cm/cm) |
| --- | --- | --- |
| Example 1 | 1.2 | 15.6 |
| Example 2 | 1.0 | 11.5 |
| Example 3 | 0.9 | 10.7 |
| Comparative Example 1 | 2.6 | 18.7 |
| Comparative Example 2 | 42.9 | 16.3 |

TABLE 2-continued

| Classification | Transparency (haze) | Impact strength (kg · cm/cm) |
|---|---|---|
| Comparative Example 3 | 48.2 | 16.1 |
| Comparative Example 4 | 2.7 | 21.7 |
| Comparative Example 5 | 0.9 | 5.2 |
| Comparative Example 6 | 1.6 | 22.3 |
| Comparative Example 7 | 0.9 | 7.8 |

As shown in Table 1, it can be confirmed that all of the thermoplastic resin compositions (Examples 1 to 3) of the present disclosure have superior transparency and impact strength, and thus, satisfy the purpose of the present disclosure.

However, in the case of Comparative Example 1, the rubber latex ratio and the refractive index adjustment correspond to the intention of the present disclosure, but desired transparency was not obtained because the small-diameter and large-diameter rubbers were simultaneously added during preparation of the graft copolymer such that graft-polymerization occurred.

In addition, in the cases of Comparative Examples 2 and 3, the refractive index of the rubber is different from that of the graft copolymer, or the refractive index of the graft copolymer (A) is different from that of the copolymerization resin (B), whereby a haze rapidly increases and thus transparency is decreased.

Further, in the cases of Comparative Examples 4 and 6, the $X_{a-1}/X_{a-2}$ value is less than 0.75 and thus impact strength is very high. However, desired transparency is not secured.

Finally, in the cases of Comparative Examples 5 and 7, the $X_{a-1}/X_{a-2}$ value is greater than 4 and thus excellent transparency is exhibited. However, desired impact strength is not secured.

The invention claimed is:

1. A thermoplastic resin composition, comprising:
   (A-1) a graft copolymer formed by graft-copolymerizing (a-1) a conjugated diene rubber latex having a weight average particle diameter of 500 Å to 2,000 Å with (b-1) a methacrylic acid alkyl ester compound or an acrylic acid alkyl ester compound, (c-1) an aromatic vinyl compound, and (d-1) a vinyl cyan compound;
   (A-2) a graft copolymer formed by graft-copolymerizing (a-2) a conjugated diene rubber latex having a weight average particle diameter of 2,500 Å to 5,000 Å with (b-2) a methacrylic acid alkyl ester compound or an acrylic acid alkyl ester compound, (c-2) an aromatic vinyl compound, and (d-2) a vinyl cyan compound; and
   (B) a copolymer formed by polymerizing i) a methacrylic acid alkyl ester compound or an acrylic acid alkyl ester compound, ii) an aromatic vinyl compound, and iii) a vinyl cyan compound,
   wherein the thermoplastic resin composition satisfies Mathematical Equation 1below:

$$0.75 \leq X_{a-1}/X_{a-2} \leq 4 \qquad \text{[Mathematical Equation 1]}$$

wherein $X_{a-1}$ refers to a weight of (a-1) the conjugated diene rubber latex (based on solid content) and $X_{a-2}$ refers to a weight of (a-2) the conjugated diene rubber latex (based on solid content),
   wherein a refractive index difference between (A-1) the graft copolymer and (A-2) the graft copolymer is 0.01 or less, and a refractive index difference between (A-1) the graft copolymer or (A-2) the graft copolymer and (B) the copolymer is 0.01 or less.

2. The thermoplastic resin composition according to claim 1, wherein the thermoplastic resin composition has a haze of 1.3 or less and an impact strength of 10 kg·cm/cm or more.

3. The thermoplastic resin composition according to claim 1, wherein the thermoplastic resin composition comprises 10 to 60% by weight of (A-1) the graft copolymer, 10 to 50% by weight of (A-2) the graft copolymer, and 30 to 80% by weight of (B) the copolymer, wherein (A-1)+(A-2)+(B) =100% by weight.

4. The thermoplastic resin composition according to claim 1, wherein the thermoplastic resin composition comprises 5 to 30% by weight of (a-1) the conjugated diene rubber latex.

5. The thermoplastic resin composition according to claim 1, wherein the thermoplastic resin composition comprises 5 to 20% by weight of (a-2) the conjugated diene rubber latex.

6. The thermoplastic resin composition according to claim 1, wherein the thermoplastic resin composition comprises a methacrylic acid alkyl ester compound and acrylic acid alkyl ester compound in a total amount of 20 to 70% by weight.

7. The thermoplastic resin composition according to claim 1, wherein the methacrylic acid alkyl ester compound is methyl methacrylate.

8. The thermoplastic resin composition according to claim 1, wherein the thermoplastic resin composition comprises 10 to 30% by weight of an aromatic vinyl compound.

9. The thermoplastic resin composition according to claim 1, wherein the aromatic vinyl compound is one or more selected from the group consisting of styrene, α-methylstyrene, o-ethyl styrene, p-ethyl styrene, and vinyltoluene.

10. The thermoplastic resin composition according to claim 1, wherein the thermoplastic resin composition comprises 0 to 10% by weight of a vinyl cyan compound.

11. The thermoplastic resin composition according to claim 1, wherein the vinyl cyan compound is one or more selected from the group consisting of acrylonitrile, methacrylonitrile, and ethacrylonitrile.

12. The thermoplastic resin composition according to claim 1, wherein (A-1) the graft copolymer is formed by polymerizing 20 to 70% by weight (based on solid content) of (a-1) the conjugated diene rubber latex with 20 to 60% by weight of (b) a methacrylic acid alkyl ester compound or acrylic acid alkyl ester compound, 7 to 30% by weight of (c) an aromatic vinyl compound, and 0 to 10% by weight of (d) a vinyl cyan compound.

13. The thermoplastic resin composition according to claim 1, wherein (A-2) the graft copolymer is formed by polymerizing 20 to 70% by weight (based on solid content) of (a-2) the conjugated diene rubber latex with 20 to 60% by weight of (b) a methacrylic acid alkyl ester compound or acrylic acid alkyl ester compound, 7 to 30% by weight of (c) an aromatic vinyl compound, and 0 to 10% by weight of (d) a vinyl cyan compound.

14. The thermoplastic resin composition according to claim 1, wherein (B) the copolymer is formed by polymerizing 30 to 75% by weight of a methacrylic acid alkyl ester compound or acrylic acid alkyl ester compound, 15 to 40% by weight of an aromatic vinyl compound, and 0 to 20% by weight of a vinyl cyan compound.

15. The thermoplastic resin composition according to claim 1, wherein a refractive index difference between the conjugated diene rubber latex and a polymer grafted to the conjugated diene rubber latex is 0.01 or less.

16. The thermoplastic resin composition according to claim 1, wherein a refractive index difference between (A-1) the graft copolymer or (A-2) the graft copolymer and (B) the copolymer is 0.01 or less.

17. The thermoplastic resin composition according to claim 1, wherein the thermoplastic resin composition further comprises one or more selected from the group consisting of a thermal stabilizer, a UV stabilizer, and a lubricant and antioxidant.

18. A method of preparing a thermoplastic resin composition, the method comprising a step of melt-kneading (A-1) a graft copolymer formed by graft-copolymerizing (a-1) a conjugated diene rubber latex having a weight average particle diameter of 500 Å to 2,000 Å with (b-1) a methacrylic acid alkyl ester compound or an acrylic acid alkyl ester compound, (c-1) an aromatic vinyl compound, and (d-1) a vinyl cyan compound; (A-2) a graft copolymer formed by graft-copolymerizing (a-2) a conjugated diene rubber latex having a weight average particle diameter of 2,500 Å to 5,000 Å with (b-2) a methacrylic acid alkyl ester compound or an acrylic acid alkyl ester compound, (c-2) an aromatic vinyl compound, and (d-2) a vinyl cyan compound; and (B) a copolymer formed by bulk-polymerizing i) a methacrylic acid alkyl ester compound or an acrylic acid alkyl ester compound, ii) an aromatic vinyl compound, and iii) a vinyl cyan compound, wherein the thermoplastic resin composition satisfies Mathematical Equation 1 below:

$$0.75 \leq X_{a-1}/X_{a-2} \leq 4 \qquad \text{[Mathematical Equation 1]}$$

wherein $X_{a-1}$ refers to a weight of (a-1) the conjugated diene rubber latex (based on solid content) and $X_{a-2}$ refers to a weight of (a-2) the conjugated diene rubber latex (based on solid content), wherein a refractive index difference between (A-1) the graft copolymer and (A-2) the graft copolymer is 0.01 or less, and a refractive index difference between (A-1) the graft copolymer or (A-2) the graft copolymer and (B) the copolymer is 0.01 or less.

19. A molded article manufactured from the thermoplastic resin composition according to claim 1.

20. The molded article according to claim 19, wherein the molded article is a washing machine cover, a cleaner dust collector, a toy, a game machine housing, a home appliance transparent window, or an office equipment transparent window.

* * * * *